United States Patent [19]
Coogan et al.

[11] Patent Number: 6,059,313
[45] Date of Patent: May 9, 2000

[54] TWO POSITION MOTOR VEHICLE SAFETY SCREEN ASSEMBLY

[75] Inventors: James Dean Coogan; Paul Statham; Mark Anthony Giumelli, all of Camden Park, Australia

[73] Assignee: Rees Operations Pty. Ltd., Australia

[21] Appl. No.: 09/011,489

[22] PCT Filed: Aug. 2, 1996

[86] PCT No.: PCT/AU96/00485

§ 371 Date: Feb. 2, 1999

§ 102(e) Date: Feb. 2, 1999

[87] PCT Pub. No.: WO97/04991

PCT Pub. Date: Feb. 13, 1997

[30] Foreign Application Priority Data

Aug. 2, 1995 [AU] Australia .................. PN4536

[51] Int. Cl.⁷ .................................. B60R 21/06
[52] U.S. Cl. ............................ 280/749; 296/24.1
[58] Field of Search .................... 280/749, 748; 244/118.1, 121; 410/117, 118, 130, 129; 296/24.1; 248/548

[56] References Cited

U.S. PATENT DOCUMENTS

| | | | |
|---|---|---|---|
| 4,703,669 | 11/1987 | Hyodo | 74/492 |
| 4,924,814 | 5/1990 | Beaudet | 119/712 |
| 5,026,231 | 6/1991 | Moore | 410/118 |
| 5,529,341 | 6/1996 | Hartigan | 280/749 |
| 5,735,564 | 4/1998 | Coogan . | |

FOREIGN PATENT DOCUMENTS

| | | |
|---|---|---|
| 75794/87 | 7/1987 | Australia . |
| 54990/94 | 2/1994 | Australia . |
| 65940/94 | 6/1994 | Australia . |
| 30395/95 | 8/1995 | Australia . |

*Primary Examiner*—Paul N. Dickson
*Assistant Examiner*—Faye M. Fleming
*Attorney, Agent, or Firm*—Brown, Martin, Haller & McClain, LLP

[57] ABSTRACT

A two position motor vehicle safety screen is adapted to be mounted in either a front or rear position within the vehicle interior. The screen is fixedly secured in the front position by a pair of short length upper securing straps, each of which has its forward end attached to the screen and its rear end secured to the vehicle roof by a quick release connector and a pair of relatively long bottom securing straps each of which has its forward end releasably attached to the screen and its rear end pivotally attached to an anchorage fitting in the vehicle floor. In the rear position, the screen is secured in position by the upper straps and also by means of a pair of hook forming attachment lugs depending from the bottom end of the screen and which are arranged to releasably interlock with the anchorage fittings, in which position the bottom securing straps are disengaged from the screen and swung inwardly to a storage position in front of the screen.

11 Claims, 5 Drawing Sheets

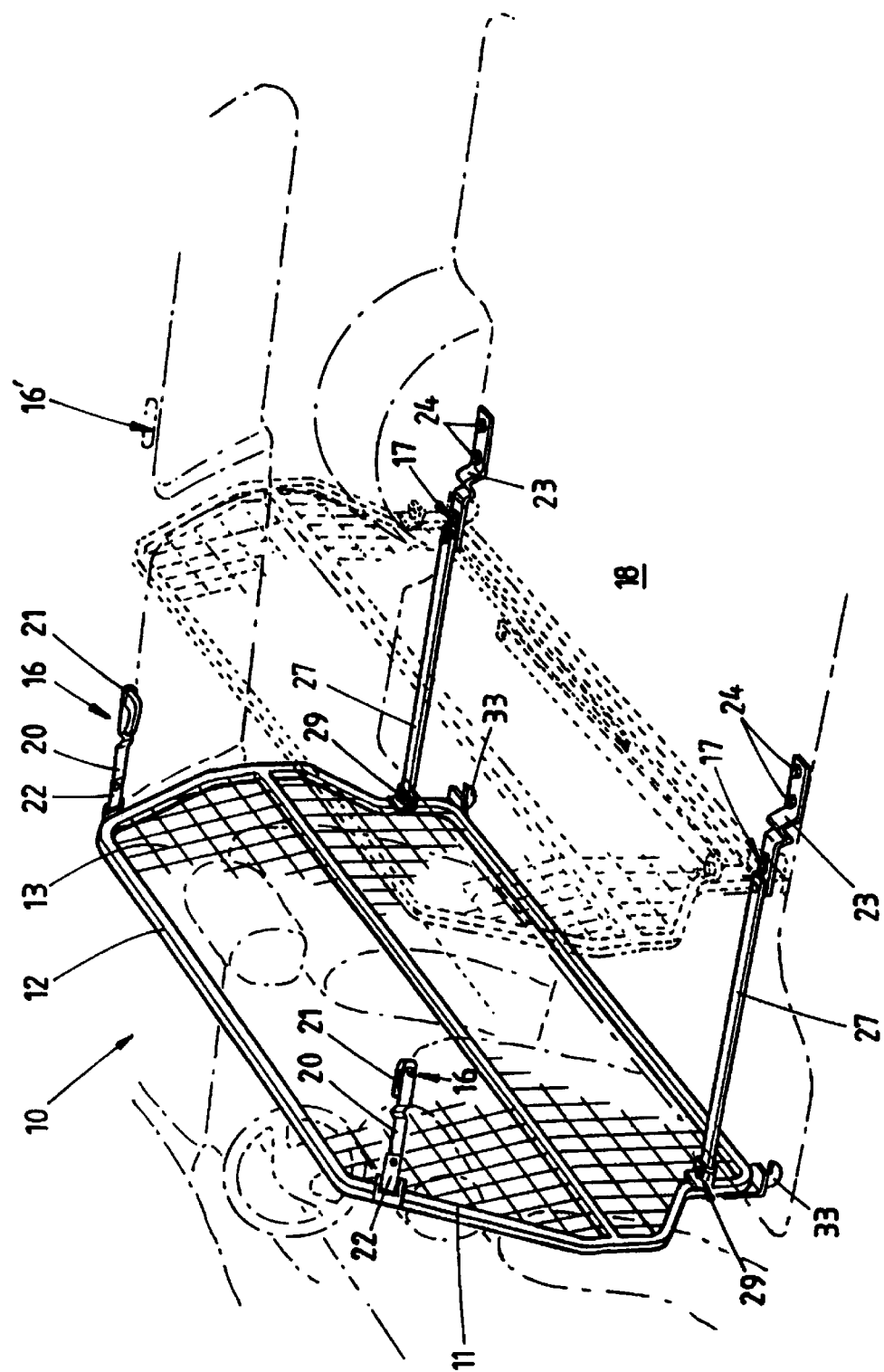

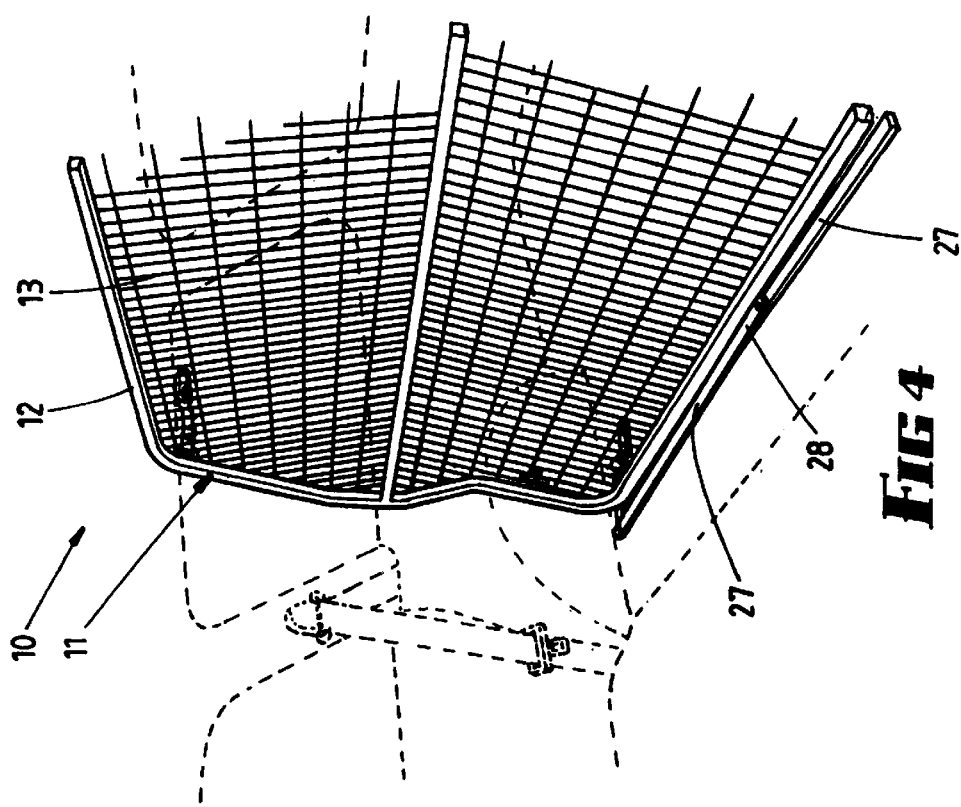
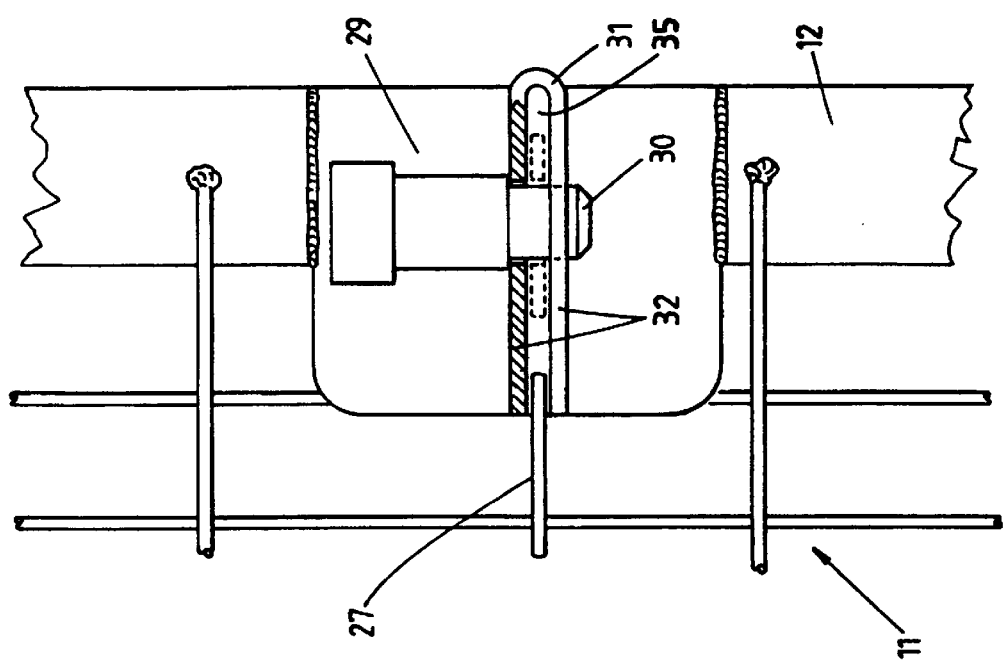

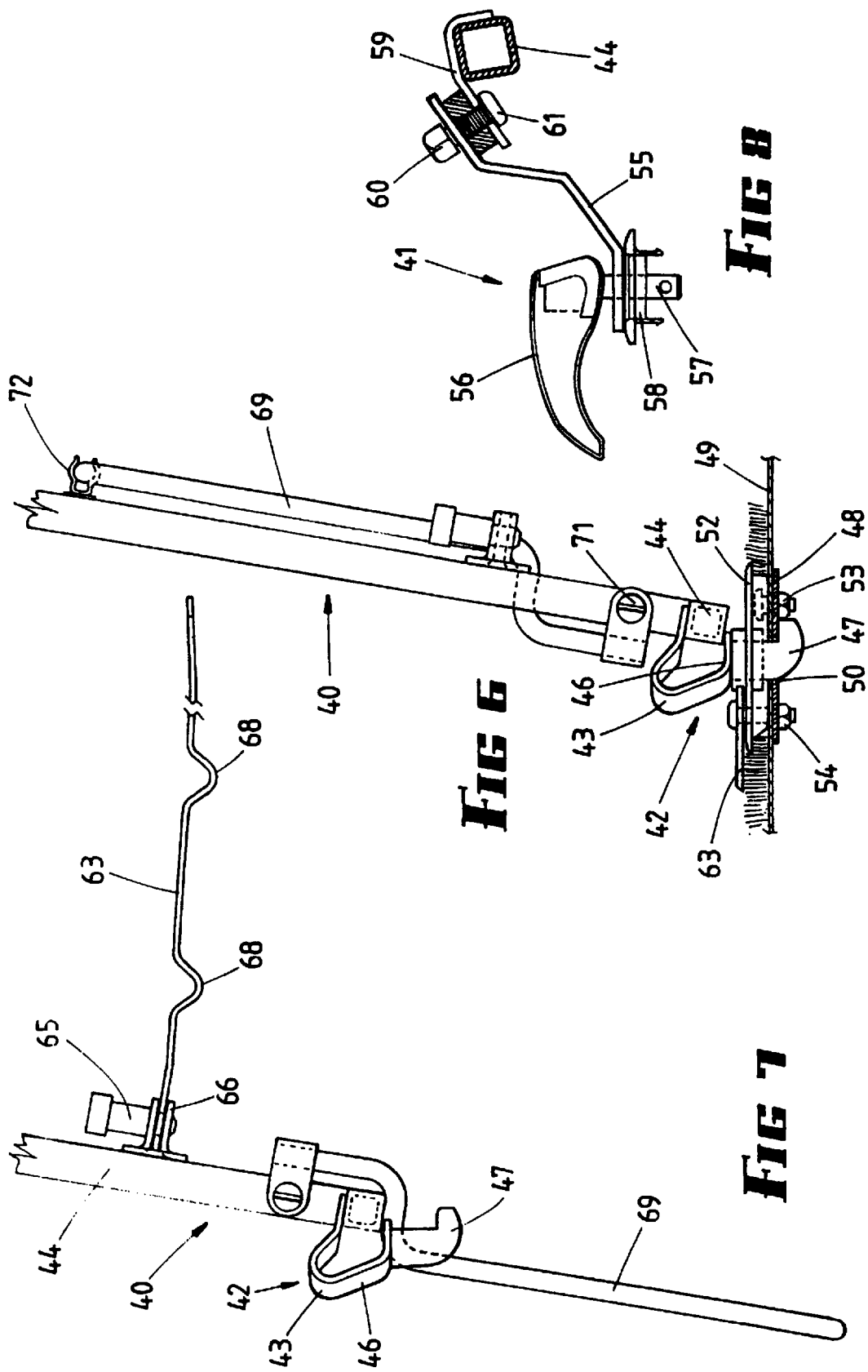

TWO POSITION MOTOR VEHICLE SAFETY SCREEN ASSEMBLY

BACKGROUND OF THE INVENTION

This invention relates to an improved motor vehicle safety barrier assembly which is arranged to be selectively fitted in one or more positions within a vehicle to inhibit the forward movement of an unrestrained load carried behind a driver or passenger in the vehicle, and in particular to improved fixing means by which the safety screen is secured in either of two positions within the vehicle.

A two position motor vehicle safety screen is described and illustrated in the applicant's Australian patent specification 583738 entitled "Vehicle Safety Screen Fixing Means". The fixing system described therein comprises several pairs of securing straps each of which is pivotally secured at its forward end to an attachment point on the safety screen frame, with its rear or trailing end being secured by a fastener to an anchorage point fixed in the vehicle roof or vehicle floor. The securing straps are permanently connected to the screen frame. There are two pairs of bottom straps for anchoring the bottom corners of the screen to the vehicle floor, one of those pairs comprising short-length straps for securing the screen when in its rear position. The other pair comprises relatively long straps which, when the screen is in its rear position, are folded inwardly to lie alongside the base of the screen frame. In order to mount the screen in the forward position, the relatively long straps are swung outwardly to respective positions whereat their rear ends are secured by fasteners to anchorage points fixed in the vehicle floor panel adjacent the wheel arches.

Although the above described screen assembly has proven generally satisfactory in use, it has been found that by having two-sets of bottom straps permanently connected to the screen frame, it is awkward for a person to shift the screen from one position to the other. In particular the straps tend to catch on objects or surfaces within the vehicle when the screen is bodily moved either rearwards to its rear position or from its rear position to its forward position. Still further when in the rear position, the relatively long straps are stored behind the screen at the base thereof and hence interfere with the storage space at the rear of the vehicle.

SUMMARY OF THE INVENTION

It is the main object of the present invention to provide an improved securing system for a motor vehicle safety screen which allows the safety screen to be simply and quickly installed in a selected one of two or more positions within the vehicle.

It is another object of the present invention to provide an improved securing system for a multi-position motor vehicle safety screen whereby the screen can be very readily and conveniently shifted from one position to another.

Broadly according to this invention, a two position assembly comprises a safety screen adapted to be mounted in either a forward or rear position in the interior of the vehicle so as to extend transversely thereof between a load carrying area and a vehicle seat, and securing means for fixing the screen when thus mounted in said forward or rear position, said securing means comprising:

a pair of transversely spaced apart anchorage fittings fixed with respect to the vehicle floor, a pair of short-length upper securing straps positioned one at or adjacent each upper corner of the safety screen, each said upper strap having its forward end attached to the screen and its rear or trailing end adapted for securement, in each position of the screen, to the vehicle roof (or in the vicinity thereof), a pair of relatively long, lower securing straps each of which is releasably attached at its forward end by a quick-release connector means to a lower region of said screen, with its rear or trailing end being anchored to a respective said anchorage fitting, and quick release mechanical interlocking means for releasably anchoring the lower portion of the safety screen directly to said anchorage fittings when the screen is in said rear position, constructed and arranged so that (i) when the screen is in said forward position, said relatively long bottom straps secure the lower portion of the screen to the vehicle floor and extend approximately longitudinally thereof, with each bottom strap extending between a rear attachment point on its associated anchorage fitting and its quick-release forward end attachment point on the screen, while (ii) when said screen is mounted in the rear position, the forward ends of the lower straps are detached from the screen and the straps moved to a storage position with the lower portion of the screen being secured to the vehicle floor by virtue of said releasable interlocking means.

More specifically according to this invention, a two position safety screen assembly comprises:

a safety screen adapted to be mounted in either a forward or rear position in the interior of the vehicle so as to extend transversely thereof between a load carrying area and a seat therein, and securing means for fixedly locating the screen when thus mounted in the vehicle, said securing means comprising:

a pair of transversely spaced apart bottom anchorage fittings fixed with respect to the vehicle floor each said anchorage fitting comprising a slot-like lug-receiving opening, hook-forming attachment lugs depending from the bottom edge of the screen and arranged to releasably interlock with said slot-like openings when the screen is mounted in its rear position, a pair of short-length upper securing straps positioned one at or adjacent each upper corner of the safety screen, each said upper strap having its forward end attached to the screen and its rear or trailing end adapted for securement, in each position of the screen, to the vehicle roof (or in the vicinity thereof), and a pair of relatively long bottom securing straps each of which is releasably attached at its forward end to a lower corner region of said screen, with its rear or trailing end being pivotally attached to an attachment point on a respective said anchorage fitting, constructed and arranged so that when the screen is in said forward position, said relatively long bottom straps secure the lower portion of the screen to the vehicle floor and extend approximately longitudinally of the vehicle floor each between its rear pivot attachment point on the anchorage fitting and its releasable attachment point on the screen, while when said screen is fitted in the rear position, the forward ends of the bottom straps are disconnected from the screen and the straps swung inwardly to a storage position where they extend transversely of the vehicle floor in overlapping relationship, with the lower portion of the screen being held secure by virtue of the interlocking engagement between the lugs and the anchorage fittings.

Preferably each of the fixed bottom anchorage fittings comprises a short length metal strap which at its forward end receives a pivot bolt to which is attached the rear end of a respective bottom strap, while the rear end of the anchorage strap is secured to the vehicle floor, eg by welding or fasteners, the slot-like opening being located intermediate the front and rear ends of the anchorage strap. The intermediate portion of the anchorage strap may be provided with one or more energy absorbing folds or wrinkles, the folds or wrinkles being effective to absorb some of the initial impact force when a load impacts against the screen.

Desirably, the hook-forming lugs are secured to the screen frame by means of metal straps which can be provided with one or more energy absorbing folds or wrinkles.

Preferably each of the relatively long bottom straps is releasably attached to a bottom corner region of the screen by means of a resiliently mounted latch pin which releasably engages a locating hole formed adjacent the leading end of the strap. The latch pin can be spring-loaded and mounted on a bracket which is fixed to the screen frame. The bottom straps may also be formed with folds or wrinkles.

It should be appreciated that the bottom anchorage fittings may be installed in the vehicle floor as original equipment and comprise metal mounting plates welded to the underside of the floor, with openings being formed in the floor which align with the pivot pin receiving holes and the lug receiving slots formed in the mounting plates, to thereby permit easy fitment of the pivot bolts for attaching the rear ends of the long bottom securing straps and also the insertion of the lugs.

Preferably the safety screen comprises a peripheral frame of metal with the space between the peripheral frame being filled with wire mesh.

Preferably each of the relatively short upper straps has its forward end pivotally connected with respect to the screen frame, and its trailing end releasably secured to an attachment point in the vehicle roof by means of a quick release connector.

With this invention, the screen can be very easily and quickly installed in its forward position by firstly connecting the upper straps to their respective anchorage locations in the vehicle roof by engaging the quick release connectors and thereafter swinging the relatively long bottom straps outwards from their inwardly folded storage positions to their longitudinally extending operative positions so that the locating holes at their forward ends align with their associated latching pins. The pins are then engaged with the straps and the screen is securely positioned. When the screen is required to be shifted to its rear mounting position, the latch pins are disengaged from the forward ends of the relatively long bottom straps which are subsequently swung inwardly to their inwardly folded overlapping storage positions; the quick release connectors are disengaged from their mounting plates (which are fixed to the cant-rails of the vehicle roof) to thereby disconnect the upper straps; the screen is then bodily shifted rearwardly to its rear location whereat the lower portion of the screen is directly attached with respect to the vehicle floor by engaging the bottom hook-forming lugs within the slots of their respective anchorage straps or plates fixed to the vehicle floor (with the screen in a tilted condition); and finally the panel is swung upwardly to an upright approximately vertical position, and the quick release connectors are engaged with their respective rearwardly located anchorage plates within the roof of the vehicle. In the rear position, the mounting of the lower portion of the panel is carried out without the use of any connectors or fasteners.

BRIEF DESCRIPTION OF THE DRAWINGS

In order to further explain the present invention, several preferred embodiments are described hereunder in some further detail wit h reference to and as illustrated in the accompanying drawings wherein:

FIG. 1 is a perspective view of a safety screen mounted behind the front passenger seat of a station-wagon vehicle (the screen also being shown in dotted lines in its second rear position behind the rear passenger seat which is folded down) according to a first embodiment of the invention;

FIG. 3 is a fragmentary side-elevational view showing the releasable connection between the forward end of one of the relatively long bottom straps and its latching means on the screen frame;

FIG. 4 is a perspective view of the screen shown fitted in its rear position with the relatively long bottom straps folded inwardly to their storage positions so as to lie in front of the screen;

FIG. 6 is an end elevational view of the screen shown if FIG. 5;

FIG. 7 is a fragmentary end elevational view of the screen shown in FIG. 5 when mounted in its forward position, with the stabiliser support leg swung down to its operative position; while FIG. 8 is a fragmentary, partly sectioned view of the one of the upper securing straps connected to an upper corner of the screen frame of FIG. 5.

DESCRIPTION OF THE PREFERRED EMBODIMENTS

Figure 2A:
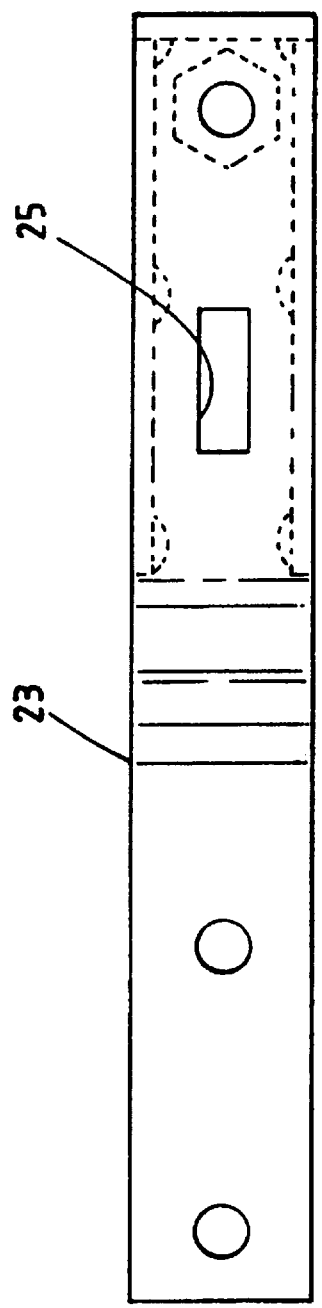
FIGS. 2(*a*) & (*b*) are plan and side-elevational views respectively of one of the fixed floor mounted anchorage straps to which is attached one of the relatively long bottom securing straps.

In the embodiment shown in FIGS. 1 to 4, a two position safety screen assembly 10 is arranged for securement in either a forward position immediately behind the front passenger seat of the vehicle or a rear position where it is mounted immediately behind the folded down rear passenger seat of the vehicle.

The screen assembly 10 comprises a screen 11 formed with a peripheral metal frame 12 and an infill panel 13 made of heavy wire mesh, welded to the peripheral frame 12.

In both the front and rear mounted positions, the screen 11 is secured in position at four anchorage points, there being two sets of upper opposite fixing points 16, 16' in the cantrails of the vehicle roof (or in the vicinity thereof) and also two lower fixing points 17 spaced apart in the floor 18 of the vehicle.

The screen 11 is provided with a pair of relatively short upper metal securing straps 20, which, in both the front and rear mounting positions of the screen, are releasably secured at their trailing ends by means of quick release connectors 21 to respective anchorage plates (not shown) fixed in the roof panel of the vehicle. The forward end of each of the straps 20, is pivotally attached to a connector 22 loosely mounted on the screen frame adjacent an upper corner thereof.

This arrangement is substantially identical to that described in the applicant's earlier filed Australian Patent 583738. The quick release connector 21 comprises a bayonet type locking pin which co-operates with a complementary shaped bayonet or key-hole opening formed in the anchorage plate. It will of course be appreciated that there will be four such anchorage plates mounted in the vehicle roof. Once again, this arrangement is similar to that described and illustrated in the Applicant's International PCT application No PCT/AU95/00562 (U.S. Pat. No. 5,735,564.

A pair of transversely opposed floor mounted anchorage fittings 23, are fixedly mounted to the floor panel 18 of the vehicle in the vicinity of its wheel arches. Each fitting comprises an anchorage strap 23 fixed to the floor panel by means of a pair of fixing screws or bolts 24 and is formed adjacent its forward end with a slot-like opening 25, the purpose of which will be explained hereinafter. Each anchorage strap 23 has pivotally attached to its forward end, the trailing end of a respective relatively-long bottom securing strap 27 by means of a pivot pin or bolt 26 which allows the strap 27 to pivot in a horizontal plane relative to the fixed strap 23. The straps 23 are bent so that each has a leading portion located above the vehicle floor 18 and a trailing portion contiguous with the floor 18.

The pair of bottom straps 27 are arranged to swing between retracted inoperative storage positions where they extend substantially transversely of the vehicle floor 18 and extended in-use positions where they extend approximately longitudinally of the vehicle. In the retracted position, the straps 27 overlap one another and are preferably held together by means of ties or a collar slidably engaged over the ends thereof.

When the screen 11 is to be mounted in its forward position, the straps 27 are swung outwardly and their forward ends connected to respective quick release latches 29 which are mounted on the screen frame 12 adjacent the bottom corners thereof. Each latch 29 comprises a spring loaded latch pin 30 which is arranged to pass through a hole formed in the strap 27 adjacent its forward end. The latch 29 comprises a latch pin carrier bracket 31 which has inner walls 32 defining a transverse slot-like opening 35 into which the forward end of the strap 27 is inserted in order to lockingly engage with the latch pin 30.

With the screen 11 in its forward position, both straps 27 extend between their attachment points on the fixed anchorage straps 23 and their latching locations on the screen frame 12. With the screen 11 in its rear position, the straps 27 are disengaged from their latches 29, and swung inwardly to their retracted positions. Once the upper securing straps 16 are released from their anchorage points in the vehicle roof, the screen 11 can be bodily shifted from its front to its rear position.

Figure 2B:
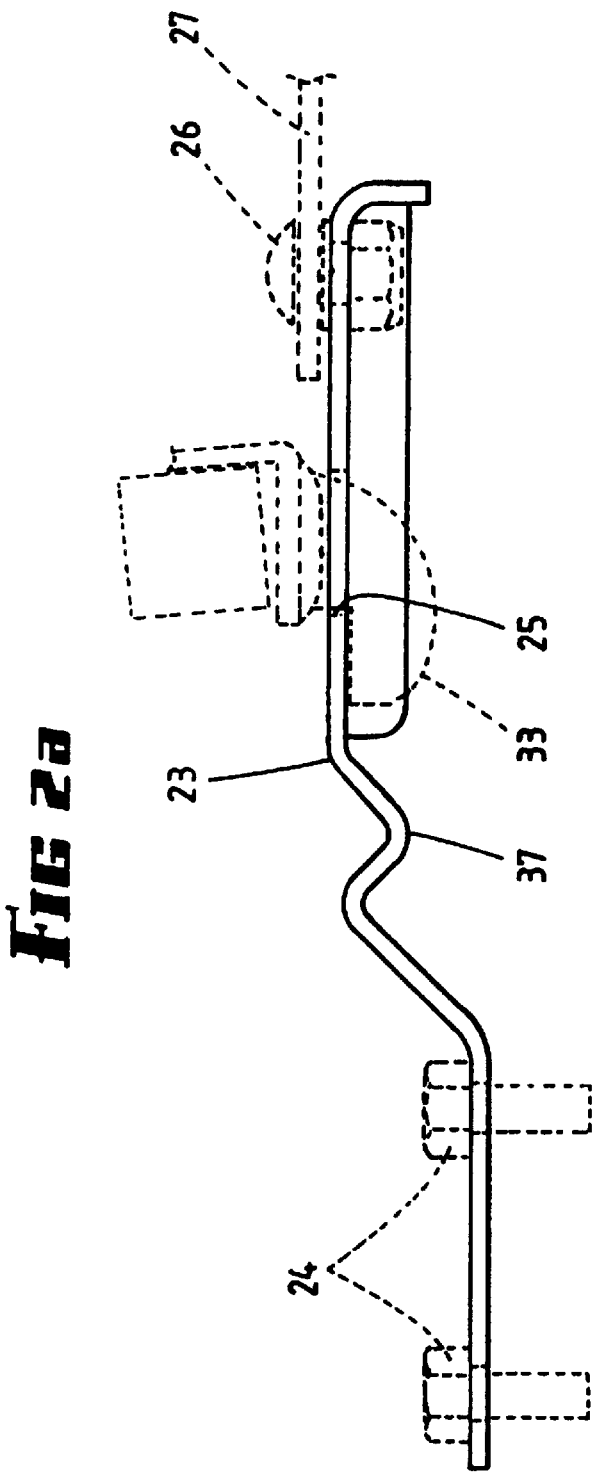
Figure 5:
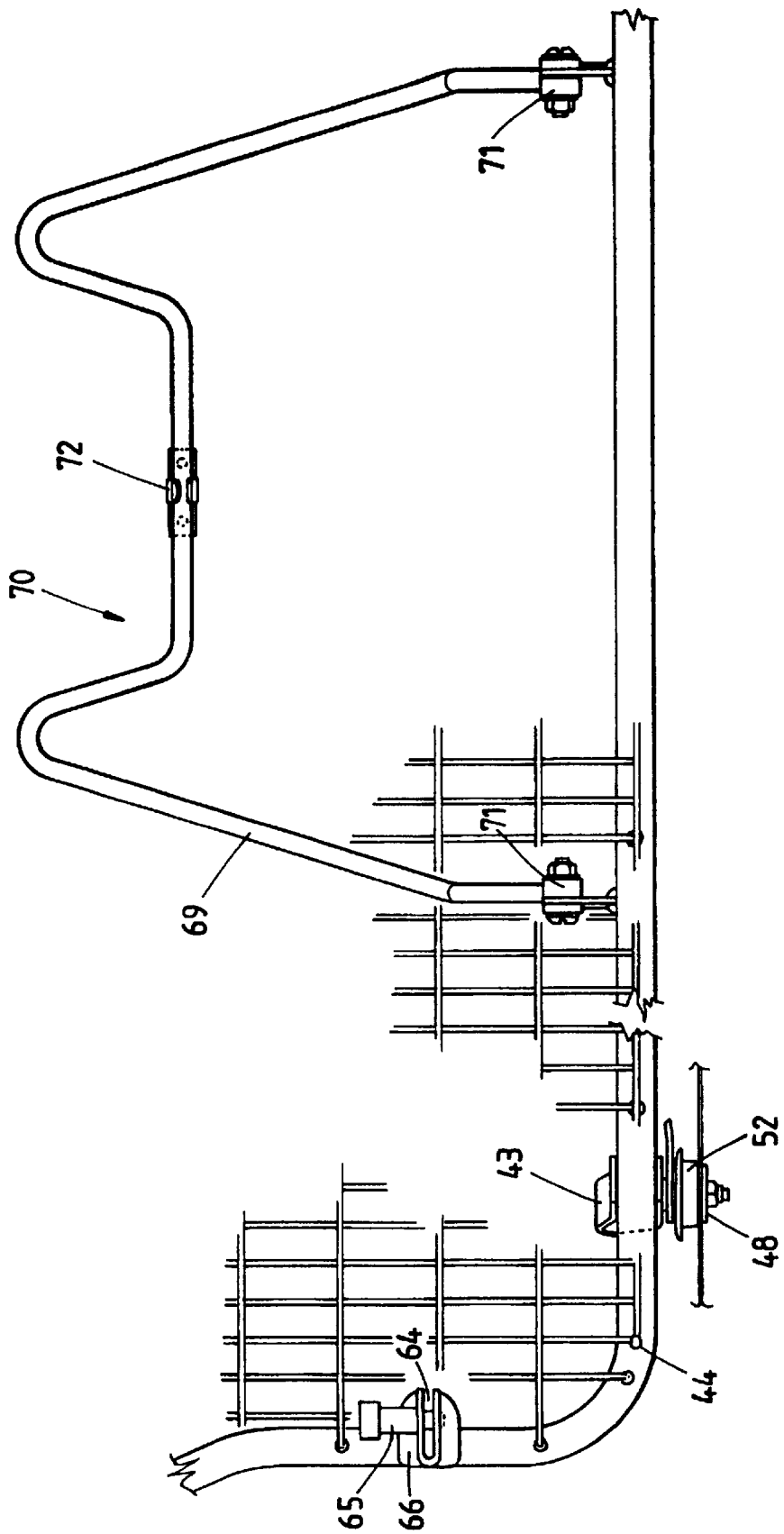
FIG. 5 is a rear-side elevational view, partly sectioned, of a two position safety screen according to a second embodiment of the invention (the screen being shown in its rear position)

As shown in FIG. 2 of the drawings, the screen frame 12 is provided on its underside with a pair of spaced apart hook forming lugs 33, each of which is arranged to releasably interengage with the slot 25 formed in the anchorage strap 23. Each lug 33 is formed to have a rearwardly facing hook recess which, when the lug is inserted through the opening 25, co-operates with an edge of the slot 25 in order to lockingly retain the bottom end of the screen in position. Normally the screen will be fitted in its rear position by firstly hookingly engaging the lugs 33 with their respective anchorage plates 23 while the screen 11 is in a tilted position, and thereafter rotating the screen to an approximately vertical position to allow the upper securing straps 20 to be connected to their anchorage points 16' by means of the quick release connectors 21.

As also shown in FIG. 2 (b) of the drawings, each of the fixed anchorage straps 23 is provided with one or more transverse folds 37 intermediate the ends thereof, the folds 37 being designed so that the strap, under load, will elongate and in turn allow the screen 11 to yield when a load impacts thereagainst. This is designed to cushion the impact and effectively absorb some of the impact energy imparted to the screen 11 and avoid any undesirable loading forces being transmitted to the fixing bolts 24.

Referring to the embodiment shown in FIGS. 5 to 8 of the drawings, a metal mesh screen 40 is anchored at or near each of its four corners by a pair of upper corner securing fittings 41 and a pair of bottom corner securing fittings 42, one of the upper fittings 41 being shown in more detail in FIG. 8 of the drawings.

Each fitting 42 comprises a metal mounting plate 43 which is approximately U-shaped and has its opposite ends secured, eg by welds, to opposite sides of peripheral frame member 44 of the screen 40. The lower leg 46 of the plate 43 has welded to it a hook-forming lug 47 (identical to that described in the first embodiment) which releasably interlocks with a fixed anchorage bracket 48 secured, eg by bolts, to the underside of the vehicle floor 49, the bracket 48 being provided with a slot 50 through which the lug 47 can be inserted with the screen 40 in a tilted condition. An apertured cover plate 52 fits over the floor mounted bracket 48 so as to conceal same, the plate 52 being bolted to the floor 49 by bolts 53, 54.

The mounting plate or bracket 43 is configured so that it can elongate under load to in turn allow the screen 40 to yield when impacted against by a moving load.

Each of the upper corner fittings 41 comprises a short-length metal mounting strap 55, quick-release connector 56 which itself comprises a bayonet-type spring loaded locking pin 57 which co-operates with a key-hole shaped opening formed in a cantrail bracket 58 fixed to the cantrail of the vehicle roof, the trailing end of the metal mounting strap 55 also being formed with a key-hole opening to allow the locking pin 57 to pass therethrough.

The leading end of the strap 55 is flexibly mounted to the screen frame 44 by means of a bracket arm 59 which is fixed to the frame 44, and a fastening bolt 60 which passes through aligned holes in the strap 55 and bracket arm 59 and held in place by a self-locking nut 61. A resilient gasket 62 is mounted between the strap 55 and the arm 59 so as to permit limited flexing of the strap 55 at its connection point.

Referring to FIG. 7, the screen 40 is shown fitted in its front position, with its bottom mounting straps 63 connected at their forward ends to the screen frame 44 by means of quick-release spring-loaded latch pins 65 which engage in holes formed in the straps 63. The forward end of each strap 63, when in its latching position, locates in a transverse slot-like opening 64 formed between upper and lower walls of the latch body 66 which in turn is welded to the frame 44. In the latching position, each of the locking pins 65 passes through aligned holes in the latch body 66 and the strap 63. The rear ends of the straps 63 are pivotally secured to respective bolts 54 which form part of the screen rear anchorage floor mountings (refer FIG. 6). Each of the straps 63 can be formed with energy absorbing wrinkles 68 for the purpose as explained hereinbefore. In the rear position of the screen, the straps 63 are detached from the screen and folded inwardly to lie in front of the screen—similar to that described in the first embodiment.

In the front position, the screen 40 is stably supported by means of a retractable stabiliser leg 69 which has a central recessed portion 70 which snugly straddles the tail shaft tunnel in the floor of the vehicle. This is designed to minimise lateral movements of the screen 40 when the vehicle is in use. The stabiliser leg 69 can be swung between an extended operative position (shown in FIG. 7) and a retracted storage position (shown in FIG. 6) when the screen is fitted in its rear position. The leg 69 is pivotably attached to the screen frame 40 at the bottom thereof by a pair of spaced apart pivot mountings 71. A clip 72 holds the leg 69 in its retracted position.

In a variation to the above described embodiments, the rear ends of the bottom straps are releasably anchored to floor mountings so that when the screen is in the rear position, the bottom straps can be removed altogether and stored away. In a still further variation, the hook-forming lugs on the screen frame may be replaced by loops or rings which insert through openings in the vehicle floor to engage with retention hooks fixed beneath the vehicle floor.

In yet a further variation, the hook-forming lugs are each provided with an engagement protrusion or nib on its leading edge which is designed to prevent the disengagement of the hook from its slot in the anchorage plate in the floor in a situation where the safety screen undergoes a "rebound" movement after the initial load impact. The rebound action will generally occur with screens having some degree of inherent resilience. As the screen moves in a rearwards direction, it is desirable that the lugs remain interlocked with their anchorage plates so that the bottom portion of the screen remains secure.

A brief consideration of the above described embodiment will indicate that the invention provides a vastly improved fixing system for a motor vehicle safety screen which allows the screen to be mounted in either one of two positions quickly and easily. The fixing system also greatly facilitates the task of re-locating the screen from one position to the other, which can be readily carried out by a single person.

We claim:

1. A two position safety screen assembly comprising:

a rigid safety screen adapted to be mounted in either a forward or rear position in the interior of the vehicle so as to extend transversely thereof between a load carrying area and a vehicle seat; and securing means for fixing the screen when thus mounted in said forward or rear position, said securing means comprising:

a pair of transversely spaced apart anchorage fittings for securing to a vehicle floor;

a pair of rigid, short-length upper securing straps positioned one at or adjacent each upper corner of the safety screen, each said upper strap having its forward end attached to the screen and its rear or trailing end adapted for securement, in each position of the screen, to the vehicle at a position on or adjacent to the roof thereof;

a pair of rigid relatively long, lower securing straps for securing a lower portion of the screen, when in its forward position, to the vehicle floor, each said lower securing strap having a forward end and a rear end, a quick-release connector between the forward end of the lower securing strap and the screen for releasably securing the lower securing strap to the screen, the rear end of the lower securing strap being secured to a respective said anchorage fitting; and hook forming fixing lugs secured to and depending from the bottom edge of the screen and arranged to releasably engage in slot-like opening in said anchorage fittings for securing the lower portion of the screen directly to the anchorage fittings when the screen is in its rear position;

each said lower securing strap, when the screen is in its forward position, being arranged to extend approximately longitudinally of the vehicle floor between a rear attachment point on its associated anchorage fitting and its quick-release forward end attachment point on the screen, while when said screen is mounted in the rear position, the forward ends of the lower straps are detached from the screen and the straps moved to a storage position.

2. A two position safety screen assembly according to claim 1 including a pivot member pivotally attaching the rear end of each said lower securing strap to its said anchorage fitting, whereby the lower straps can be swung inwardly to a storage position where they extend transversely of the vehicle floor when the screen is to be mounted.

3. A two position safety screen assembly according to claim 1 wherein each of the fixed anchorage fittings comprises a short length bent metal strap having a rear portion fixedly secured by means of fasteners to the vehicle floor, and a front portion spaced a short distance above the vehicle floor, said slot-like opening being formed in said front portion of the metal strap.

4. A two position safety screen assembly according to claim 1 wherein each of the anchorage fittings comprises a mounting plate arranged to be fixedly secured to the vehicle floor on the underside thereof, said mounting plate having a pivot pin receiving hole at its forward end, said slot-like opening being formed intermediate the ends of said plate.

5. A two position safety screen assembly according to claim 3 wherein said metal anchorage straps each comprises an intermediate portion containing one or more energy absorbing folds or wrinkles, said folds or wrinkles being effective to absorb some of the initial impact forces when a load impacts against the screen.

6. A two position safety screen assembly according to claim 1 wherein said quick-release connector for each of said lower securing straps comprises a latch fitting mounted on the screen.

7. A two position safety screen assembly according to claim 6, wherein each lower strap has a locating hole formed adjacent the forward end, and said latch fitting comprises a spring loaded latch pin which is arranged to lockingly engage in said locating hole.

8. A two position safety screen assembly according to claim 6, wherein said screen has a peripheral frame member and said latch fitting is secured to said peripheral frame member.

9. A two position safety screen assembly according to claim 8, wherein a bracket arm is secured to the peripheral frame member at each upper corner of the screen and each of the relatively short upper securing straps has its forward end pivotally connected to a respective bracket arm, and its trailing end having a quick release connector for releasably securing to an attachment point in the vehicle roof.

10. A two position safety screen assembly as claimed in claim 2, wherein said lower securing straps, when folded to their storage positions, lie in front of the screen, when in its rear position, in overlapping relationship.

11. A two position safety screen assembly according to claim 1 further comprising a pivotal tailshaft tunnel engaging stabiliser leg movable between a retracted storage position wherein it overlies a bottom portion of the screen and an extended, in-use position where it depends from the bottom edge of the screen and restrains the screen against lateral movement.

\* \* \* \* \*